Patented Mar. 12, 1935

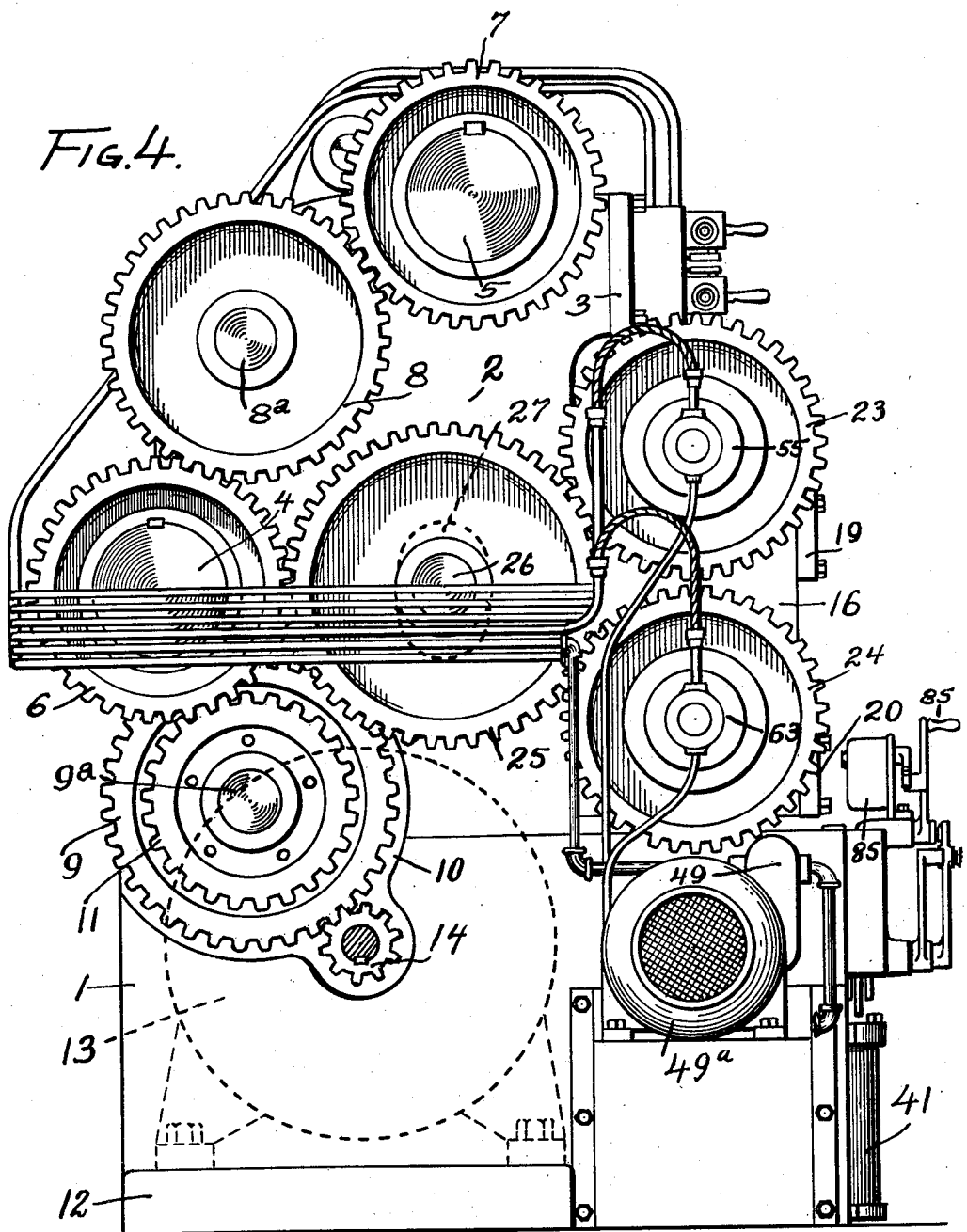

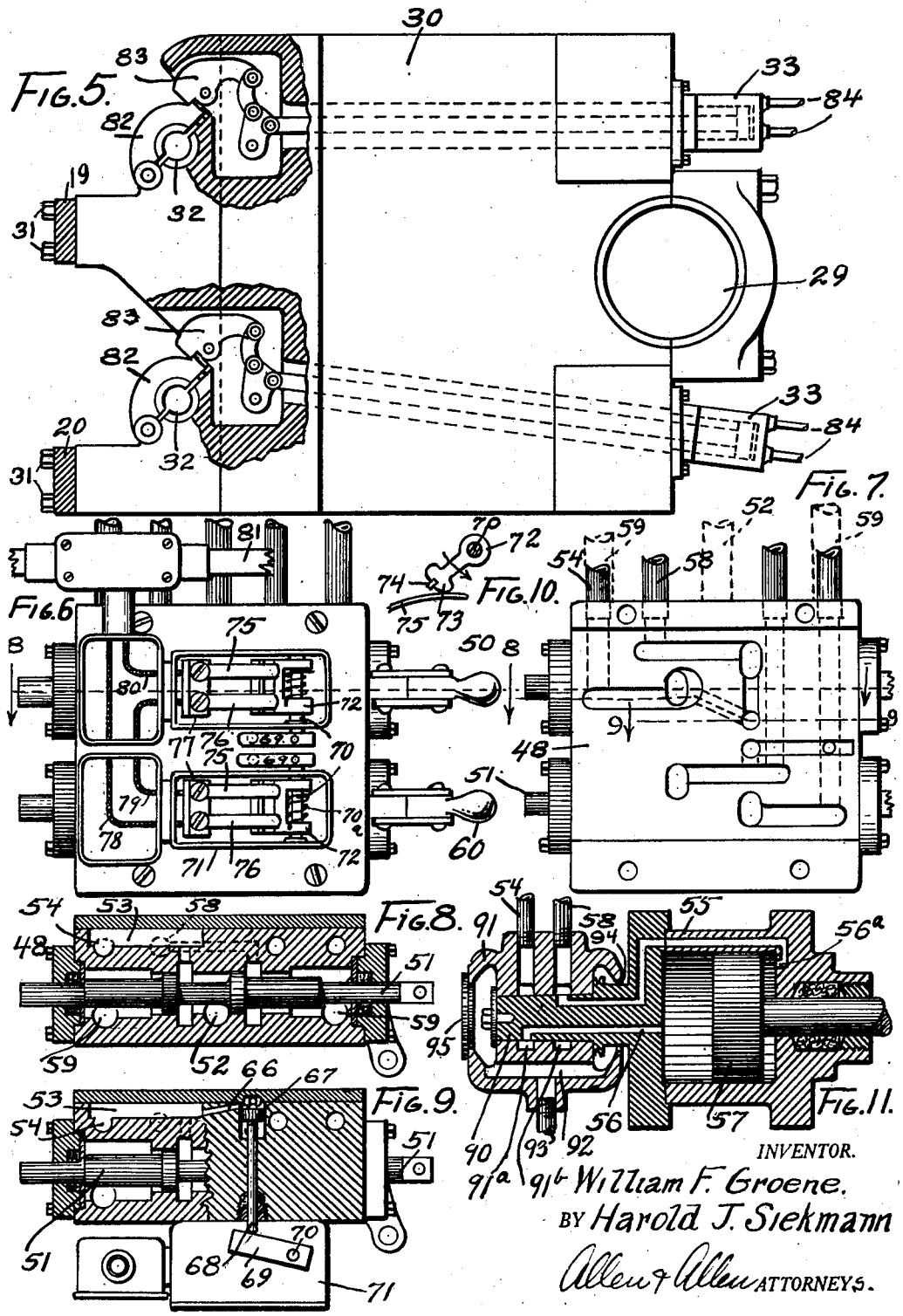

1,993,994

UNITED STATES PATENT OFFICE 1,993,994

ORBITAL LATHE

William F. Groene and Harold J. Siekmann, Cincinnati, Ohio, assignors to The R. K. LeBlond Machine Tool Company, Cincinnati, Ohio, a corporation of Delaware Application August 30, 1933, Serial No. 687,447

20 Claims. (Cl. 82—9)

Our invention relates to crankshaft pin turning lathes, wherein all the connecting rod pins of a multiple throw crankshaft are finished in one turning operation.

Certain constructions illustrated or referred to in this application are disclosed and claimed in Reissue Patent No. 18,662, of November 22, 1932, Patent No. 1,921,919, August 8, 1933, Patent No. 1,878,130, September 20, 1932, and pending applications, Ser. No. 641,244 and Ser. No. 565,144.

In previous machines of this type for turning a plurality of crankshafts simultaneously, the crankshafts were held in chucks which revolved on a fixed axis, and the orbitally moving tools were fed to the work by a movement additional to their orbital movement.

In the present invention the tools have no movement specific for the cutting feed, though they do travel in an orbital path, and the chucks, with the work, are moved to the tools for the cutting feed. This makes possible a more rigid machine, in that, while the tool carrying frames are only orbital in motion, ample provision may be made to prevent lateral displacement of the tool frames from their orbital paths. The manner in which the work is fed to the tools also is simplified, and greater ease of loading the work in the holding chucks and steady rest is attained.

Another object is to provide a system of starting controls whereby possibility of human error is minimized, to prevent injury of the operator and wrecking the lathe.

Another object is to overcome many of the usual leaks in the high pressure oil connections to the various parts of the lathe; especially in the connecting unit for conducting the oil to the chucks under pressure.

Other objects will appear in the following description illustrated by the accompanying drawings, in which:—

Fig. 4 is an elevation of the drive end of the lathe, omitting the driving motor.

Fig. 5 is a side elevation of one of the steady rest members, certain parts being in section.

Fig. 6 is a face view of the left hand control unit with its operating levers and certain connections.

Fig. 7 is a rear elevation of the same unit.

Fig. 8 is a horizontal longitudinal section of the same unit on line 8—8 of Fig. 6.

Fig. 9 is a similar section of the same unit on the two-plane line 9—9 of Fig. 7.

Fig. 10 is a detail plan view of a contact device for the electrical circuit of one of these units.

Fig. 11 is a vertical longitudinal section on the center line of one of the revolving fluid admission joints of one of the clutch cylinders, with its connections.

Fig. 12 is an elevation of the cam side of the cam and rack member.

Figure 1:
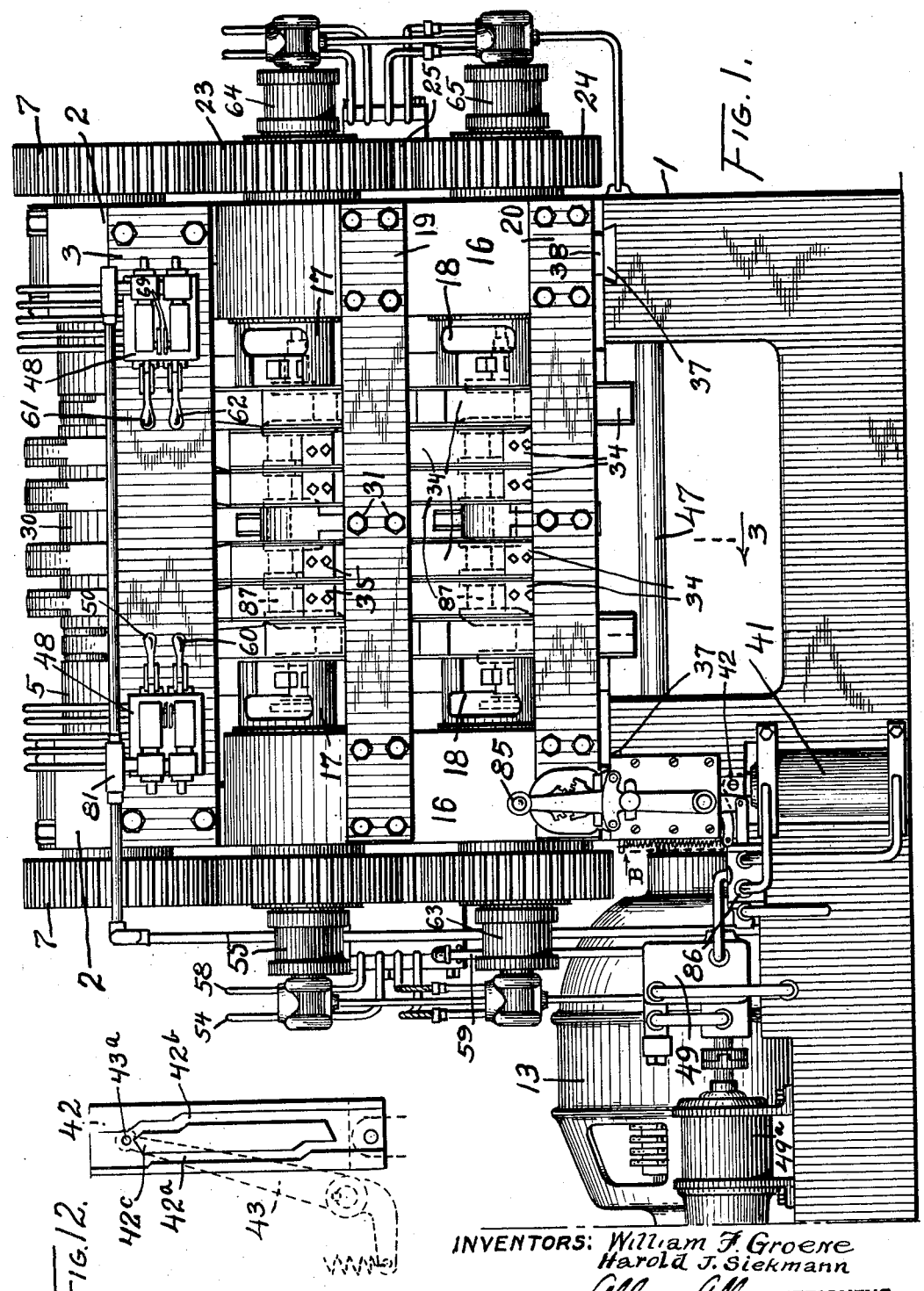
Figure 1 is a front elevation of a crankshaft lathe embodying our invention.

The machine has the base 1, the end frames at 2, and a tie bar 3 for the end frames. Lower and upper master crankshafts 4 and 5 are journaled in the end frames 2; the upper master crankshaft 5 being forward from the vertical plane of the lower master crankshaft 4. These master crankshafts have fixed on their outer ends, gears 6 and 7, each two meshing with an intermediate gear 8 turning on a respective stud shaft 8a, fixed in the end frame. The left-hand end frame supports a gear 9 in a recess 10 formed in the end frame 2 and base 1, and turning on a stud 9a along with a smaller gear 11, to which it is fixed. This smaller gear 11 meshes with the lower master crank gear 6. The base extension 12 supports the main driving motor 13, having a driving pinion 14 in mesh with the larger gear 9. It will be understood that the necessary equipment for the control of the motor 13 is provided as usual.

Figure 2:
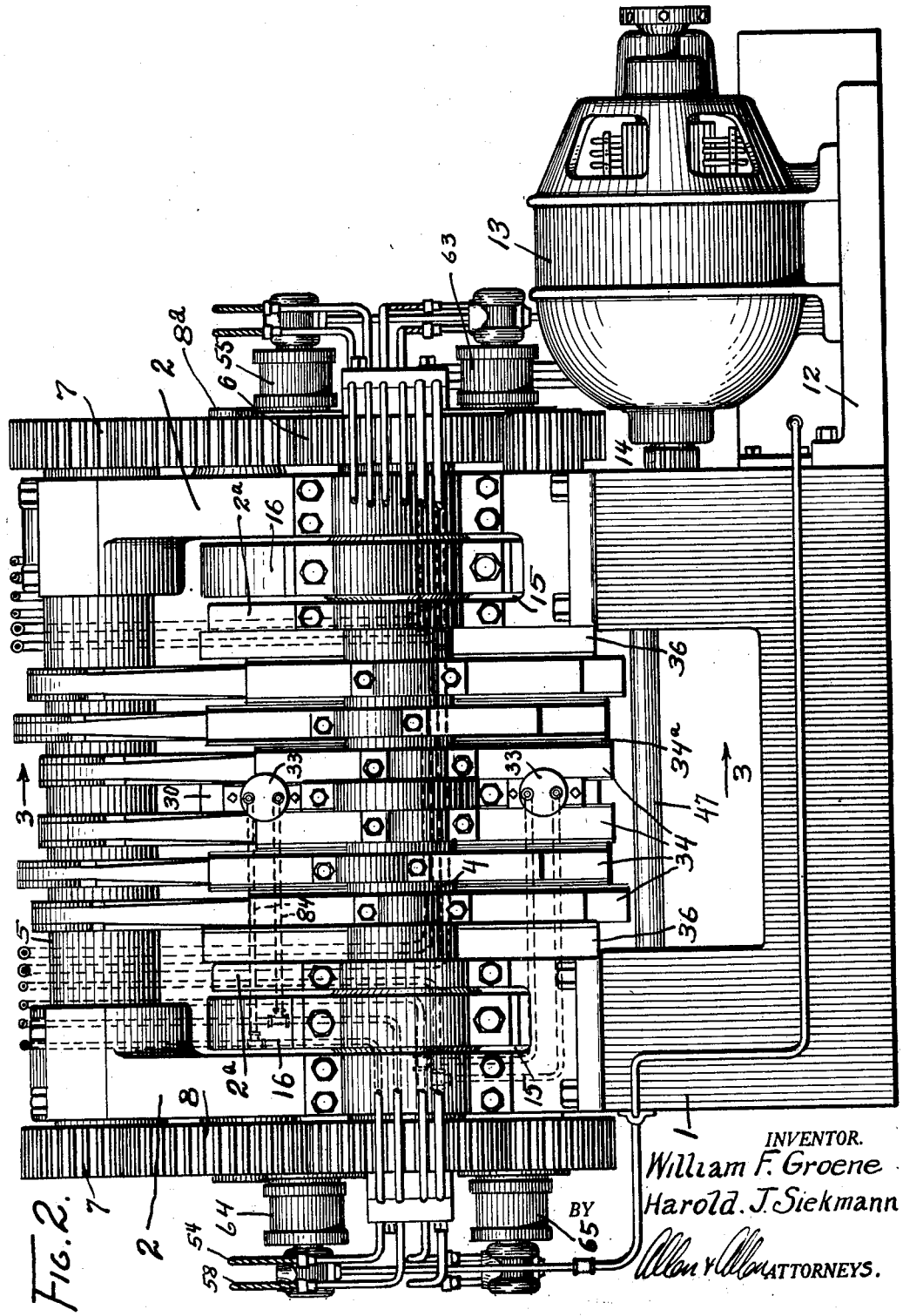
Fig. 2 is a rear elevation of the lathe, certain piping being broken away to more clearly show the construction.

Each end frame 2 is of U-shape, as is seen in Fig. 2, with an inner smaller portion 2a leaving a space 15 between it and the larger outer portion. These spaces 15 are occupied by respective work carrying members 16, having their rear ends pivoted on parts 16a of the lower master crankshaft 4 centered on the axis of rotation. Each one of these members 16 has journaled in bearings in its front upwardly and downwardly widened part, two hydraulic chucks 17 and 18. These chucks are similar to those shown in Patent No. 1,878,130. The two work carrying members 16 are tied together at their front portions by upper and lower tie bars 19 and 20. At the inner lower front portions of each work carrying member 16 is a bearing 21 in which is journaled a roller 22. Mounted on the spindles of the chucks 17 and 18 where they project out through their bearings in the member 16 at the respective ends of the machine are driving gears 23 and 24, meshing with an intermediate gear 25 journaled on a stud shaft 26, carried by the respective member 16. These stud shafts 26 project through slots 27 in the walls of the end frames 2. The intermediate gears 25 also mesh with the respective gears 6 on the master crankshaft 4. Thus the chucks are rotated in synchronism with the master crankshafts 4 and 5. The master crankshaft 4 has web portions 4b concentric with its support bearings. These web portions are embraced by bearings 29 of the respective steady rest members 30 (Figs. 1, 2 and 5), which have their front portions secured by bolts 31 to the tie bars 19 and 20.

The steady rest member carries the usual bearings 32 with clamping members adapted to be held clamped around the middle line bearing of the crankshaft, preferably by mechanisms operated by pressure cylinders 33, as disclosed and claimed in certain issued patents and copending applications heretofore mentioned. Mounted on the wrists of the lower master crankshaft 4 and connected to the wrists of the upper master crank-shaft 5 by link members 5a, are the tool frames 34, each consisting of a heavy plate with the tool carrying blocks 35 mounted on their forward edges, supporting the tools 35a below the respective chuck axes, so as to move these tools in orbital paths in planes at right angles to the chuck axes. At the right and left ends of the tool frames are longitudinal thrust resisting members 36. These, together with the end frames 2, the tool frames and the steady rest member, form an uninterrupted mass of metal across the machine. This arrangement prevents lateral displacement of the orbitally moving tool frames, and reduces the possibilities of inaccuracy of the tool operation. The tool frames 34 have bearing plates 34a, 34b and 34c between them. Mounted on an extension base 12, alongside of the driving motor, is the hydraulic pressure unit, consisting of any suitable commercial hydraulic pump capable of furnishing large volume and high pressures of fluid for chucking and rapid traverse, and also low volume and high pressure for the feeding operation; such a pumping unit as that manufactured by Vickers, Incorporated, for instance, being entirely suitable. Since the valves that control the output of these hydraulic units are no part of this invention, and are furnished by the pump manufacturer to suit the requirements of the work to be done, no description of the valves will be made, it being believed sufficient to state what will occur as they are operated. In the base 1 are front-to-rear ways 37 in which slide cam blocks 38, each having a rearwardly extended rack bar 39, with the teeth projecting down through slots 40 in the ways 37. The rollers 22 of the work carrying members 16 bear upon the tops of the respective cams 38. These tops are inclined downwardly, forwardly, so that they lift the work frames when slid forwardly, and allow them to drop when slid backwardly.

Mounted in the front of the base 1 on a vertical axis, is a power cylinder 41, having the usual piston, connected to a combined cam and rack member 42 extending up from the cylinder and having on its front face cam grooves 42a and 42b, receiving a cam roller 43a carried by a lever 43. The construction and operation of this cam device is the same as that of the cam disclosed in our Reissue Patent No. 18,662, of November 22, 1932, and in copending applications, Ser. Nos. 565,144 and 641,244; and no more than a general statement as to its working will be needed to understand its functions in the lathe of this application.

On the rear portion of the cam and rack member 42 are the rack teeth 44, meshing with a small gear 45, which meshes with a larger gear 45a to the rear; the latter meshing with a similar gear 45b to the rear of it; and this third gear 45b meshing with a gear 46 keyed to a connecting shaft 47, which extends across the rear of the bed 1, and is understood to have a similar gear 46 keyed to it near the opposite end of the machine. These gears 46 mesh with the teeth of the respective rack bars 39 of the cams 38, and serve to traverse the cams in the ways 37 when power is applied by the piston in the cylinder 41, as later will be explained. Mounted on the top tie bar 3 at the front of the lathe are four control valves 48, all alike, which admit pressure from the pump 49 to the operating devices of respective work-holding chucks and steady rests on the lathe. This pump 49 is in constant operation, driven by the motor 49a, whenever the lathe is in use; the stopping of the lathe to change work pieces having no effect on the running of the pump 49.

The movement of the control valves 48 is used also to close an electric circuit to the main motor 13, which supplies the power to operate the lathe. A pair of crankshafts having been placed in the chucks 17 and 18 of the lathe, the operator then proceeds to operate, say, the control lever 50 of the valve 48 at the upper left, placing the valve 51 in the position shown in Fig. 8, admitting pressure fluid from supply pipe 52 to passage 53, and to pipe line 54, which connects to the upper left-hand chuck operating cylinder 55 through a port 56 (Fig. 11); the pressure moving the piston 57 of the operating cylinder and closing the upper left-hand chuck 17 upon that end of the crankshaft. The fluid in the opposite end of this cylinder 55 is exhausted through the passage 56a to pipe 58, through the valve 48 to exhaust line 59, and then to the pump supply tank. Having operated lever 50, the operator, in turn, operates levers 60, 61 and 62 which, in the manner just explained cause the operation of the other chuck cylinders 63, 64 and 65, thus gripping both crankshafts firmly at both ends in the respective chucks 17 and 18.

When the valves 48 are operated to grip the crankshafts in the chucks, there are two additional simultaneous operations, viz., a plunger is actuated to operate an electric switch, and the clamps on the steady rests are locked in closed position around the middle line bearings of the crankshafts, as before mentioned. Fluid pressure being admitted to any one of the valves 48, before described, and reaching passage 53 (Figs. 8 and 9), a portion of the fluid is diverted to a passageway 66, Fig. 9, and passes into a piston chamber 67, operating a piston on a push rod 68, the outer end of which bears against a lever 69, which is fixed on a shaft 70 of an electric switch device 71, and yieldingly held toward it by a spring 70a. If swung outward, this lever closes part of the power circuit to the main control switch of the motor 13, as will be described.

As we prefer to construct each switch device 71, there is fixed on the shaft 70 thereof an arm member 72 of insulating material, with lateral rounded extensions 73 at its end, and a projecting metal contact element 74 in the middle of said end. Two spring contact fingers 75 and 76 are mounted on an insulating block 77 at one end of the device, and contact with one of the insulating extensions 73 of the arm member 72 when the circuit is to be open, and with the contact element 74 when the arm member is swung to close the circuit, in the direction of the arrow in Fig. 10. The fingers 75 and 76 are so connected with the main driving motor 13 and its switch and current source by the wires 78, 79 and 80, extending through conduits 81, that all of these four switch devices must be closed to complete the circuit through the motor 13, when the main starting switch of the motor is closed. Thus, not until the levers 50, 60, 61 and 62 have all been operated to close the chucks will all of the circuit closing switches be held in closed position for starting the motor 13 by closure of its control switch not shown.

Figure 3:
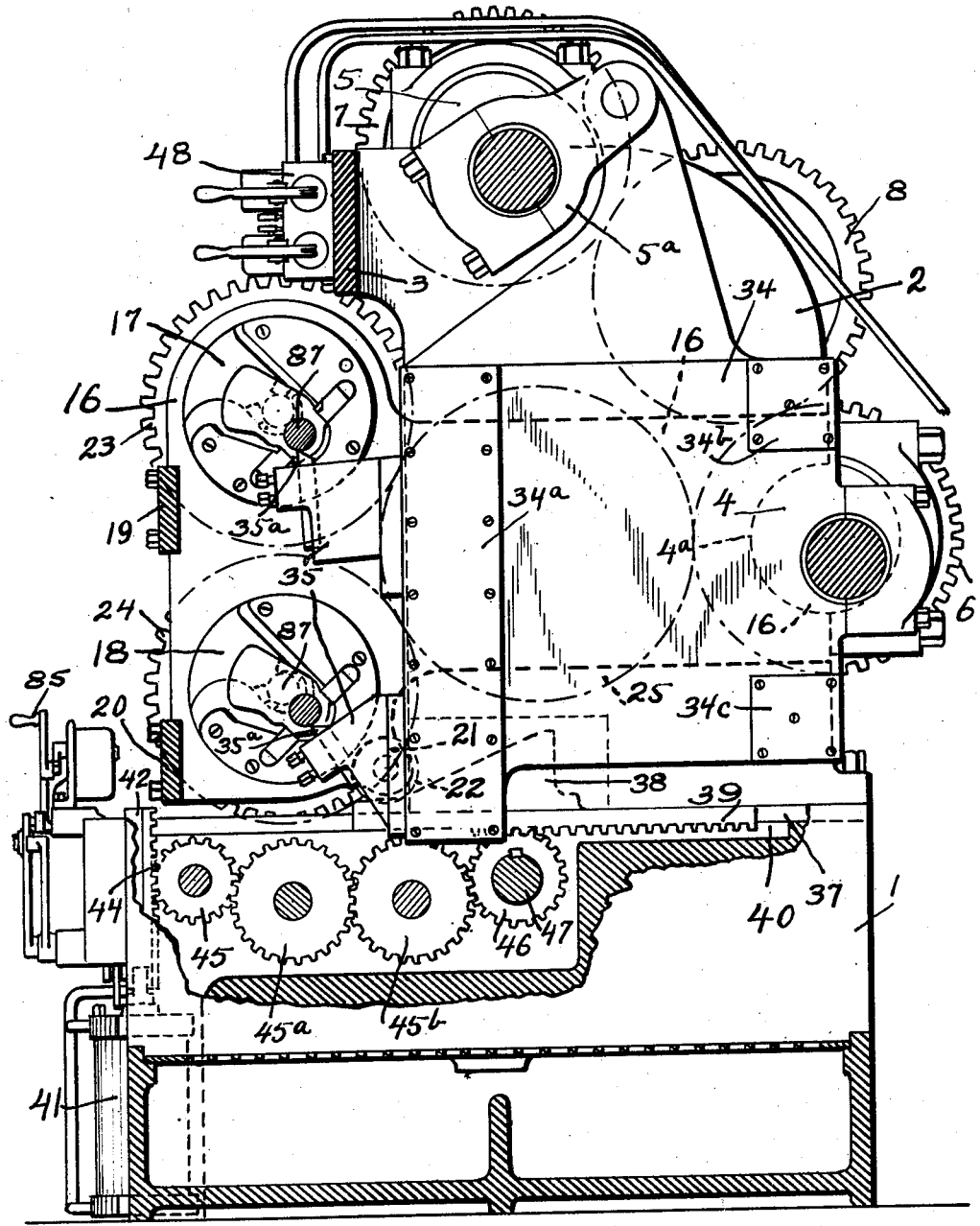
Fig. 3 is a vertical front-to-rear section on line 3—3 of Fig. 1.

When the operator places the crankshaft in the chucks 17 and 18, and before he operates the levers 50 for the chucks, he closes the clamp members 82 on the steady rest members 30 over the crankshaft bearings, so that the power operated clamp-holding members 83 may move into position and hold the part of the crank-shaft midway of its length concentric with its end supports in the chucks. Power to operate the holding members 83 on the clamp members 82, is supplied by branches 84 of the pipe lines 54 and 58 of the chuck operating devices, so that when lever 50 is operated, power is supplied to close the steady rest clamp holding members 83 at the same time that the chucks are closed on the work. As shown in Fig. 3, the parts are in the position they assume when they have reached the completion of the cutting feed and are ready for reversal. At the beginning of the operation the cams 38 are forward, and rollers 22 on the bottom of the tool carrying members 16 are resting at the tops of the cam slopes. The operator throws starting switch 85, starting the motor 13 and setting the chucks and master cranks to rotating; and then throws feed lever 43, causing fluid from control valve 86 of the fluid pressure pump 49 to pass into pipe lines 87 and force the piston of that cylinder downward. When the operator of the lathe moves lever 43 to the right, he sets the control pin or roller 43a on the rear of this lever in a position to track in the cam groove 42a on the front face of member 42 and controls the speed of the travel of the piston in cylinder 41 by its throttling action on the control valve 86. The action of the cam on cam rack 42 is the same as that in the before mentioned patents and pending applications, and, it is believed, needs no further description.

The crankshafts 87, being turned on their longitudinal axes by chucks 17 and 18, the tool frames 34 with their tools are traveling in orbital paths imparted by the master crankshafts, since the tool frames are mounted on the wrists of the master shafts, rotating in time with those of the crankshafts to be turned.

As the cam and rack member 42 moves downward, the rack 44 on its rear face imparts motion to gears 45, 45a, 45b and one gear 46, which turns the shaft 47 and the other gear 46. These gears 46, by meshing with the teeth of the rack bar extensions 39 of the cams 38, cause the cams 38 to travel rearwardly. As these cams 38 move rearwardly, the work support structure, carrying the revolving chucks with the crankshafts rotated thereby, moves the crankshafts downwardly, providing the feeding of the crankshafts towards the tools. The first part of the travel of cams 38 may be a rapid traverse until the tools 35 reach the path of the web portions of the crankshafts; then, due to the shape of the control cam on the cam and rack member 42, the turning of the chucks of the webs can be done at a slower rate of feed until the tools reach a point near the pins of crankshaft; then the control cam will still further reduce the rate of feed and the crank pins or wrists of the crankshaft may be finished at this slowest rate of feed. Upon completion of the feeding movement, the pin 43a, on lever 43, reaches the end 42c of the cam groove 42a, and a spring 89 causes the lever 85 to move the pin to the second cam groove 42b in the member 42. The valve 86 is thus reversed, and the piston in cylinder 41 is caused to move upward with a rapid traverse, causing a rapid forward movement of cam 38, and a rapid retraction upward of work carrying structure 16, carrying the crankshafts away from the tools. The lever 43, by reason of its connections to the control cam 42 and control valve 86, stops the upward travel of the work carrying structure, and also reopens the electric switch devices 71, whereupon the entire lathe comes to rest. The operator may then operate levers 50, 60, 61 and 62, releasing the crankshafts from the chucks and steady rests and locking the machine against accidental starting.

In Fig. 11 we show a provision for avoiding fouling of the machine from leakage of the pressure-impelled operating fluid, usually oil, at the connections with the rotating chucks. The cylinder 55, in which the piston 56 works for operating the chuck, has a tapered projection 90 coaxial with the bearing in which the chuck rotates, and the ports or passages 56 and 56a lead out through the sides of the projection. The connection head 91 has a tapered bearing in which this projection fits with as nearly fluid-tightness as it is practical to make it; the head having annular grooves 91a and 91b in constant communication with the ports 56 and 56a, respectively, as the cylinder and projection rotate, and communicating, respectively, with the pipes 54 and 58, for the purposes previously described.

This head 91 has, preferably formed integrally therewith, an enclosure 92, joining the upper part of the head and enclosing the axially outer part and the lower parts of the head, with a drain pipe 93 leading out of its bottom. Where this enclosure surrounds the projection 90 next to the cylinder, its edge 94 is very close to the projection, with the drain opening sufficiently below its plane to afford considerable capacity for fluid leaking from either end of the bearing. The outer end of this enclosure is similarly left open, for purposes of construction, and is closed by a plate 95. This provision we have found to effectively eliminate trouble heretofore had from leakage of such connections in machines of this type. The drain pipe 93 leads to the oil reservoir.

It will be seen that we have provided a combination in which the tool supports have merely the simple orbital motion, instead of this motion combined with tilting or other motions for feeding, as found in previous orbital lathes. This is especially advantageous in a multiple crank shaft lathe, owing to the necessary size and weight of the tool supports; and permits especial advantage to be derived from the close bearing of the tool supports laterally against each other and the sides of the frame. The swinging feed motion of the work support is simply provided for, and permits a simple planetary drive of the chucks from the mechanism that drives the master crankshaft. This also permits the relatively simple operating means for swinging the work support, and simple arrangement of the hydraulic devices and of the automatic control of these devices, including the electrical control devices for the motor, insuring a maximum of safety in operation.

We have rather specifically illustrated and described our invention herein, but it will be understood that modifications may occur in practice, and therefore that we are not limited to such precise disclosure, but what we claim as new and desire to secure by Letters Patent, is:

1. In an orbital lathe for turning a plurality of crank pins on each one of a plurality of crankshafts simultaneously, tool supports, one for each crank pin on a shaft, a work support, a plurality of work holders rotatable on parallel axes on said work support, one for each shaft, a plurality of tools on each tool support, at least one for each work holder, said work support being movable to and from said tool supports along a desired line in a plane at right angles to the work holder axes, and the tools being arranged on the tool supports for approach of the work holders to the respective tools in the general direction of said line of movement along said plane, and means supported independently of the work carrying the tool supports and operatively connected to the work holders, imparting orbital movements to the tool supports along said plane in synchronism with the rotations of the work holders.

2. In an orbital lathe for turning crank pins on a plurality of crank shafts simultaneously, a work support and a tool support, a plurality of work holders rotatable on parallel axes on said work support, a plurality of tools on said tool support, one for each work holder, mechanism imparting an orbital movement to said tool support in a plane at right angles to the work holder axes in synchronism with the rotation of the work holder, comprising a rotatable member, said work support swinging in said plane on the axis of rotation of said member, said work holders and the respective tools being arranged so as not to be displaced materially along said plane from a single arc of swinging movement of said work support, and the tools being arranged on the tool support for approach of the respective work holders thereto in the general direction of said arc of swinging along said plane.

3. In an orbital lathe, a work support and a tool support, a work holder rotatable on said work support, means imparting an orbital movement to said tool support in a plane at right angles to the work holder axis in synchronism with the rotation of the work holder, and a tool carried on said tool support, said work support being mounted to swing in said plane to move the work holder to and from the tool.

4. In an orbital lathe, a work support and a tool support, a work holder rotatable on said work support, rotary means imparting an orbital movement to said tool support in a plane at right angles to the work holder axis in synchronism with the rotation of the work holder, comprising a rotatable member, and a tool carried on said tool support, said work support being mounted to swing in said plane on the axis of rotation of said member to move the work holder to and from the tool.

5. In an orbital lathe, a work support and a tool support, a work holder rotatable on said work support, a master crank rotatable in synchronism with the rotation of the work holder, said tool support being carried by said crank in an orbital path in a plane at right angles to the work holder axis and said work support being mounted to swing in said plane on the axis of rotation of said crank, and a tool carried on said tool support in a position whereby the work holder moves to and from said tool incident to the swinging of said work support.

6. In an orbital lathe, a work support, a plurality of work holders rotatable on parallel axes on said work holder, a tool support, rotatable means operatively connected to the work holders for rotation in synchronism therewith and carrying said tool support in an orbital path in a plane at right angles to the axes of rotation of the work holders, and tools carried on said tool support, said work support being mounted to swing along said plane, and the work holders, the tools and the axis of swinging of said work support being so relatively located that the work holders approach the tools, incident to said swinging, along lines closely following a single arc of said swinging.

7. In an orbital lathe, a work support and a tool support, a work holder rotatable on the work support, a tool on the tool support, and mechanism comprising a rotatable member carrying the tool support in an orbital path in a plane at right angles to the axis of rotation of the work holder, said work support swinging on the axis of rotation of said member to move the work holder to and from the tool, and said mechanism also comprising a gear on said rotatable member and gearing on said work support planetary to said gear on said rotatable member, synchronizing the rotations of said member and said work holder.

8. In an orbital lathe, a work support and a tool support, a plurality of work holders rotatable on parallel axes on said work support, a plurality of tools on said tool support, at least one for each work holder, and mechanism comprising a rotatable member carrying the tool support in an orbital path in a plane at right angles to the axes of rotation of the work holders, said work support swinging on the axis of rotation of said member to move the work holders to and from the respective tools, means synchronizing the rotations of said member and said work holders, and a steady rest member unitarily connected with the work holders and carried by said rotatable member to swing concentrically with said work support.

9. In a lathe having a rotatable work holder, a tool support, a tool on said support, a support swinging the work holder to and from the tool, and mechanism comprising a cam determining the rate of swinging movement of said work holder support.

10. In a lathe having a rotatable work holder, a tool support, a tool on said support, a support swinging the work holder to and from the tool, and mechanism comprising a cam operatively related to the work holder support to control swinging thereof, gear means connected to said cam, a fluid-pressure-operated device connected to the gear means, and means controlling the pressure in said device and thereby determining the rate of swinging movement of said work holder support.

11. In a lathe having a rotatable work holder, a tool support, a tool on said support, a support swinging the work holder to and from the tool, and mechanism comprising a cam of wedge shape, engaging with said work holder support and being slidable to control swinging thereof, a rack connected to said cam, gearing operatively related to said rack, and means adapted for operation at various speeds, operatively connected to said gearing, determining the rate of swinging movement of said work holder support.

12. In a lathe having a rotatable work holder, and a plurality of tool supports and tools thereon, said tool supports being separately movable and arranged along the axis of the work holder rotation, and said work holder comprising a structure straddling the series of tool supports and mounted to swing the work holder to and from the tools.

13. In a lathe having a rotatable work holder, a plurality of tool supports and tools thereon, said tool supports being separately movable and arranged along the axis of the work holder rotation, said work holder comprising a structure straddling the series of tool supports and mounted to swing the work holder to and from the tools, said lathe also comprising mechanism to impart an orbital motion to the tool supports along a plane at right angles to the axis of the work holder and in synchronism with the rotation thereof, and said work holder being mounted to swing along said plane on an axis of the orbital motion.

14. In an orbital lathe, a rotatable chuck operable to close under fluid pressure, a tool carrier and a tool thereon, mechanism moving said tool carrier in an orbital path in a plane at right angles to the axis of chuck rotation and in synchronism with said rotation, a support for the chuck, swinging it to and from said tool, fluid-pressure-operated devices for swinging said support and operating said chuck, an electric motor in driving relation to said chuck and said tool-carried-moving mechanism, a switch controlling current supply to said motor, a valve device controlling operation of said fluid-pressure-operated devices, and means whereby said valve device holds said switch open except when set to allow closing of the chuck under the fluid pressure.

15. In a machine tool, a rotatable chuck operable to close under fluid pressure, a tool, and mechanism to cause a desired relative movement of the tool and the chuck, an electric motor in driving relation to said chuck and said mechanism, a fluid-pressure-operated device for operating said chuck, a valve device controlling operation of said fluid-pressure-operated device, a switch controlling current supply to said motor, and means whereby said valve device holds said switch open except when set to allow closing of said chuck under the fluid pressure.

16. In a machine tool, a rotatable chuck operable to close under fluid pressure, a steady-rest device comprising locking means operable under fluid pressure to lock the steady-rest device, a tool, and mechanism to cause a desired relative movement of the tool and the chuck, an electric motor in driving relation to said chuck and said mechanism, a fluid-pressure-operated device for operating said chuck and said steady-rest locking means, a valve device controlling operation of said fluid-pressure-operated device, a switch controlling current supply to said motor, and means whereby said valve device holds said switch open except when set to allow closing of said chuck and locking of said steady-rest locking means under the fluid pressure.

17. In combination with a rotatable chuck comprising a fluid-pressure-operated device for opening and closing the chuck, rotatable with the chuck, a projection on said chuck, coaxial therewith, having a passage for flow of fluid to and from said device, and a connection head surrounding said projection with an approximately fluid-tight bearing, said head having a passage leading to the passage of the projection, an enclosure around one of the ends of said bearing to catch leakage from said bearing.

18. In combination with a chuck rotatable on a transverse axis, comprising a fluid-pressure-operated device for opening and closing the chuck, rotatable with the chuck, a projection on said chuck, coaxial therewith, having a passage for flow of fluid to and from said device, a connection head surrounding said projection with an approximately fluid-tight bearing, said head having a passage leading to the passage of the projection, an enclosure around one of the ends of said bearing to catch leakage from said bearing, having a supporting connection with the upper parts of said head and enclosing the lower lateral and axially inner parts of said head as well as around the end of said bearing, said enclosure, at the axially inner end having an edge closely surrounding said projection, and having an outlet a substantial distance down from the lowest part of said edge of the enclosure that surrounds the projection.

19. In a lathe, a plurality of work holders rotatable on parallel axes, a common support for said work holders, a plurality of tools, at least one for each work holder, and a common support for said tools, said work holder support being mounted for swinging in such direction relative to the several tools as to swing said work holders, and work pieces held therein, simultaneously and with substantially equal rates of movement of said work pieces to their respective tools.

20. In a lathe, a plurality of work holders rotatable on parallel axes, a common support for said work holders, a plurality of sets of tools, each set arranged along the axis of rotation of a respective work holder, a plurality of supports, each common to a plurality of tools of distinct sets, said work holder supports being mounted for swinging in such a direction relative to the several tools as to swing said work holders, and work pieces held therein, simultaneously and with substantially equal rates of movement to their respective tools.

WILLIAM F. GROENE.
HAROLD J. SIEKMANN.